United States Patent [19]

Wasel et al.

[11] Patent Number: 4,711,706

[45] Date of Patent: Dec. 8, 1987

[54] METHOD OF PRODUCING GROOVE/LAND PATTERNS FOR DYNAMIC BEARINGS

[75] Inventors: Horst P. Wasel, Bornheim; Horst W. Grollius, Cologne, both of Fed. Rep. of Germany

[73] Assignee: Atlas Copco Aktiebolag, Nacka, Sweden

[21] Appl. No.: 870,170

[22] Filed: Jun. 3, 1986

[30] Foreign Application Priority Data

Jun. 13, 1985 [DE] Fed. Rep. of Germany ....... 3521181

[51] Int. Cl.$^4$ ............................................... C25F 3/16
[52] U.S. Cl. ............................................... 204/129.65
[58] Field of Search ................................... 204/129.65

[56] References Cited

U.S. PATENT DOCUMENTS

| | | | |
|---|---|---|---|
| 3,174,920 | 3/1965 | Post | 204/129.65 |
| 3,954,582 | 5/1976 | Hepp | 204/129.65 |
| 4,247,377 | 1/1981 | Eckler | 204/129.65 |

*Primary Examiner*—T. M. Tufariello
*Attorney, Agent, or Firm*—Karl F. Ross; Herbert Dubno

[57] ABSTRACT

A method of making a groove/land pattern on a bearing surface of a dynamic bearing which comprises covering the surface in regions to form lands of the pattern so as to render these regions electrolytically inactive, and electrochemically polishing the surface to form grooves of a depth up to 100 micrometers therein.

4 Claims, 4 Drawing Figures

METHOD OF PRODUCING GROOVE/LAND PATTERNS FOR DYNAMIC BEARINGS

FIELD OF THE INVENTION

Our present invention relates to dynamic bearings, i.e. bearings in which the friction between two relatively rotatable surfaces is reduced by a dynamic fluid layer which is drawn into or maintained within the interfacial clearance because of a pattern of grooves and ribs, the latter also being referred to as lands between the grooves, of one or both of the surfaces. More particularly, the invention relates to a method of journaling a rotatable member relative to another member utilizing dynamic bearing principles and of the use of electropolishing techniques, which has hitherto been associated with the elimination of surface irregularities to provide the desired groove and land pattern.

BACKGROUND OF THE INVENTION

Dynamic bearings, as has been alluded to previously, are generally formed between a rotatable member and another member, the two members having juxtaposed surfaces between which a dynamic film or layer of a fluid is induced to form as an antifriction medium.

Specifically, such dynamic bearings can be used in high-speed expansion turbines and while the fluid-antifriction medium can be a gas, it frequently is a lubricating oil.

To induce the flow of the medium into the interfacial region and to maintain the dynamic cushion of this fluid within the region, at least one of the surfaces, usually that of the rotatable member, is provided with a groove/rib pattern designed to induce the flow of the medium into the interfacial region and generate the dynamic layer referred to previously.

When the two surfaces are to define an axial bearing, the pattern is one of spiral grooves separated by corresponding ribs or lands between the grooves.

For radial bearings, i.e. when the surfaces are juxtaposed cylindrical surfaces, the groove pattern is a herringbone or generally fishbone pattern, i.e. the grooves or ribs have a chevron configuration.

The grooves which are separated by the ribs or lands, can have a depth of up to 100 micrometers.

For producing these groove and land patterns, various techniques have been developed. For example, mechanical machining techniques have been used, as well as such nonmechanical techniques as purely chemical etching and high-energy techniques such as ion-beam machining. All of the earlier techniques which have been developed for the purpose have been found to have various disadvantages and we may mention, for example, that etching results in inaccurate and rough groove edges, rounded contours of the ribs or lands between the grooves, and other detrimental characteristics such as rough groove bases and flanks and nonuniform groove depths.

All of these may give rise to nonuniform operation unless expensive after-machining techniques are employed.

For completely different purposes, namely the generation of perfectly flat surfaces free from grooves and the like, electropolishing has been developed (see Metalloberflaeche 38, 1984, page 505 to 511). Electropolishing, also known as electrochemical polishing has been used, for example, to generate smooth surfaces in metallography and microphotography following grinding, and for the decorative polishing and shining of nonferrous metals. Indeed, as far as we are aware, electrochemical polishing has only been employed on an industrial or chemical level for the smoothing or polishing of high-value plane metal surfaces in which the last thing that was desired was any form of cavity, groove or the like.

OBJECTS OF THE INVENTION

It is the principal object of the present invention to provide an improved method of making a set of dynamic-bearing grooves separated by respective lands whereby the bearing will have a greater useful life than bearings produced by other methods and which will avoid drawbacks of the earlier methods of fabricating dynamic bearings.

Another object of this invention is to provide an improved method of journaling a rotatable member utilizing an improved bearing surface.

SUMMARY OF THE INVENTION

These objects and others which will become more readily apparent hereinafter are attained, in accordance with the invention by the use of electrochemical polishing for producing a dynamic-bearing groove/rib or groove/land pattern such that the groove depth can be up to 100 micrometers and both the groove and land flanks are free from the roughness characterizing etching or even other electroerosion processes. According to the invention, the surface adapted to form the lands between the grooves is rendered inactive by covering, i.e. is masked and the grooves are then formed by subjecting the unmasked regions to electrochemical polishing.

The electrolytically inactive covering can be applied by photographic means utilizing photographic masks of the same type as those which can be employed for chemical etching.

The invention is applicable to dynamic gas-bearing surfaces as well as to the grooves of oil-bearing surfaces and for axial bearings, the pattern is preferably a spiral pattern whereas for radial bearings it is preferably a herringbone pattern.

We have discovered, quite surprisingly, that although electrochemical polishing has been conceived of as a technique for eliminating surface irregularities, it can be used to generate such surface discontinuities as the dynamic bearing grooves of the present invention without any of the drawbacks of the earlier techniques which have been used.

The method of the invention can also be considered a method of journaling a rotatable member relative to another member, the members having juxtaposed surfaces, comprising the steps of:

laying out a pattern of dynamic-bearing lands and grooves on a metallic one of the surfaces;

masking lands of the pattern;

electropolishing the one of the surfaces after the masking of the lands of the pattern to form dynamic-bearing grooves of a depth sufficient to provide a dynamic fluid bearing layer between the surfaces and up to about 100 micrometers, thereby simultaneously forming dynamic-bearing lands between the grooves;

juxtaposing the surfaces for relative rotation; and admitting a dynamic bearing fluid between the surfaces whereby the grooves and lands resulting from electropolishing form a dynamic bearing between the surfaces upon relative rotation of the members.

While the grooves can have depths up to 100 micrometers in accordance with the invention, we prefer to provide grooves of a depth of 1 to 30 micrometers. Furthermore, while various metals can be employed for electropolishing to form the grooves, the preferred metal is steel, especially for expansion turbines provided with dynamic bearings according to the invention.

Tests have shown that dynamic bearings provided with the groove/rib or land pattern according to the invention have a surprisingly increased useful life over similarly appearing patterns fabricated by other techniques and are less prone to bearing failure.

While we are not certain of all reasons for these improved results, it appears that at least in part they derive from the fact that the groove edges and the flanks of the ribs and grooves of the pattern produced in accordance with the invention are extremely smooth and flat. The absence of roughness which has been shown to be reduced by about 70% in accordance with the invention and the reduction of the maximum roughness peaks by up to 98% by comparison with earlier methods of fabricating the grooves are believed to contribute to the unique result.

The groove depth is only a function of the duration of the electropolishing step and thus can be controlled with great precision and can be accurate over the entire pattern of grooves. Even the high precision of the pattern which is produced in accordance with the invention could not have been expected from what was hitherto known as to the fabrication of such patterns or as to electrochemical polishing.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
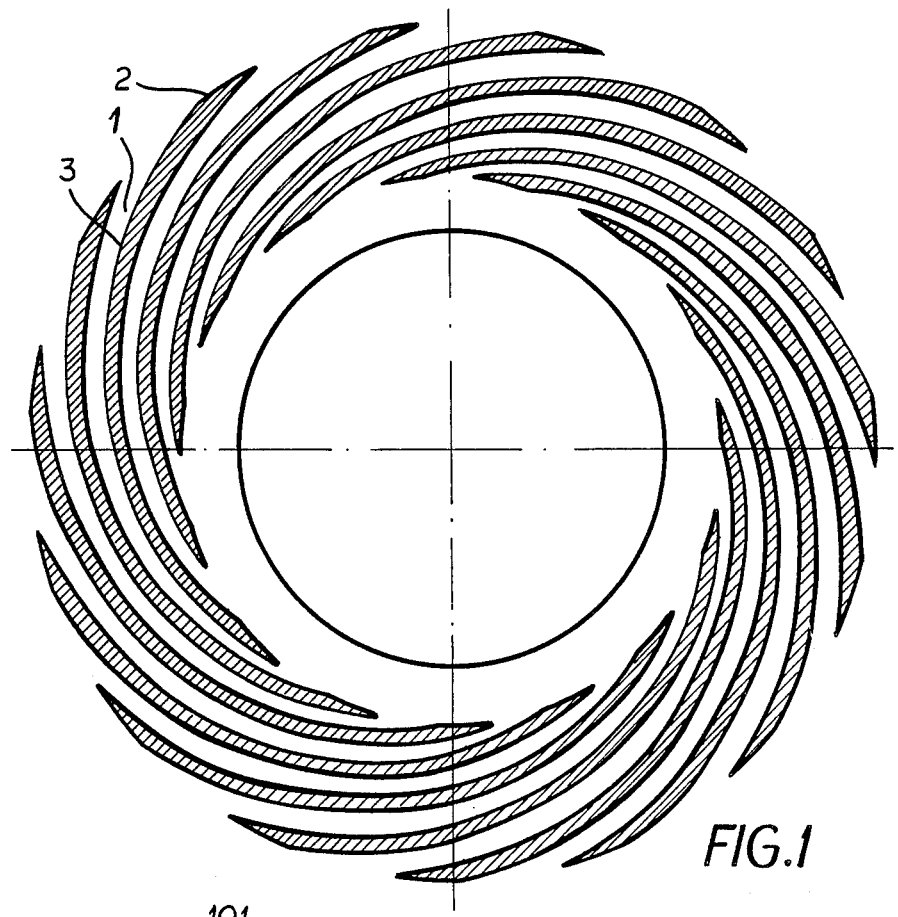
FIG. 1 is an elevational view of the axial bearing pattern of grooves and ribs according to the invention.
Figure 2:
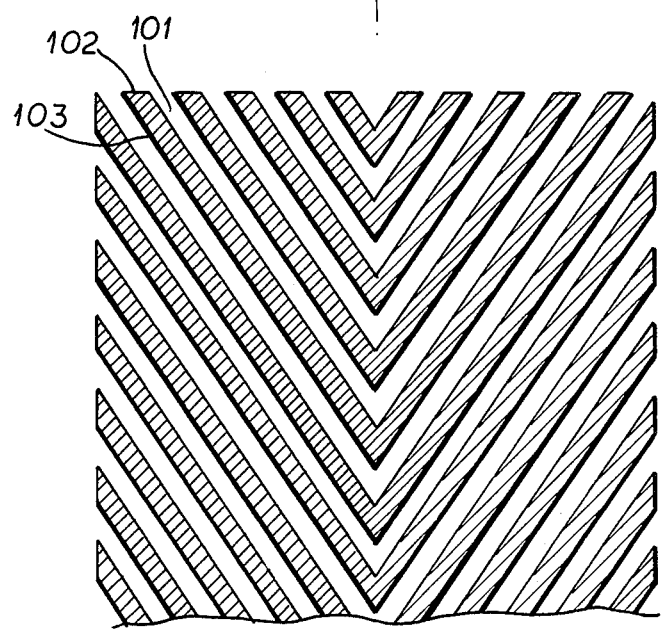
FIG. 2 is an expanded view of the pattern for a radial bearing.

The groove/land pattern shown in FIGS. 1 and 2, respectively, for an axial or thrust bearing and for a radial bearing have been enlarged over the actual pattern in a scale of substantially 5:1, thereby demonstrating the fineness of the pattern. The pattern consists of grooves 1 and 101 separated by ribs or lands 2 or 102 so that the groove and rib flanks 3, 103 are extremely flat and smooth. Sharp edge contours are provided for the lands or ribs, 2, 102.

The groove depth for the embodiment of FIG. 1 is preferably between 8 and 12 micrometers and for the embodiment of FIG. 2 is preferably about 20 micrometers. The patterns shown have the qualitative advantages over earlier dynamic bearing patterns described previously.

Figure 3:
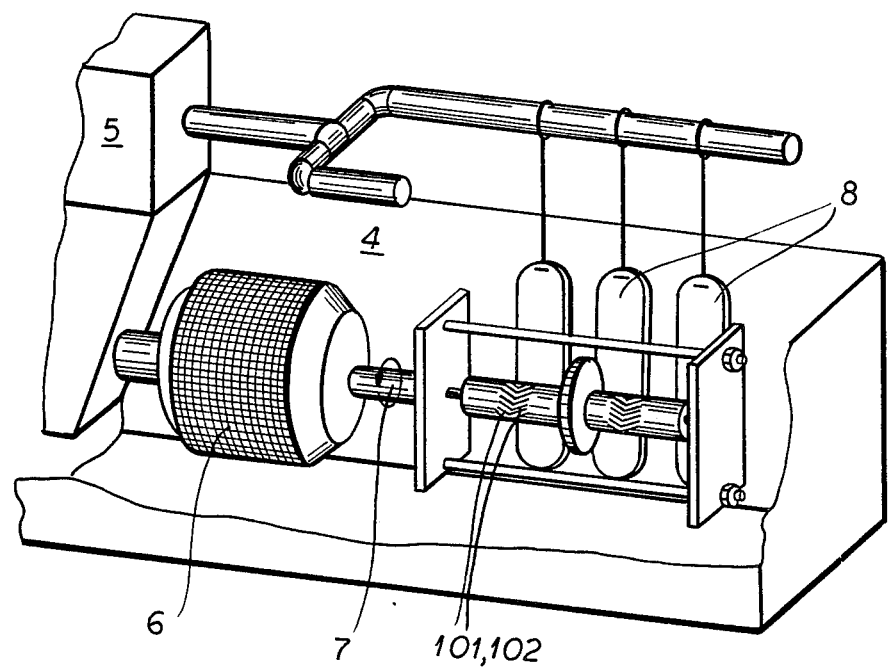
FIG. 3 is a diagram illustrating an apparatus for producing the radial bearing pattern on a shaft.

FIG. 3 shows a device for forming the pattern 101, 102 on a shaft 7, e.g. of an expansion turbine.

The device comprises a receptacle for the electrochemical polishing electrolyte, a motor being connected to the shaft 7 by a coupling 6, the motor being designated by the reference numeral 5. The shaft is photographically masked upon the lands by applying a conventional photographing etching-resist emulsion to the shaft, exposing the shaft through a negative so that selected portions of the emulsion are fixed, and washing away the portions of the emulsion at which electropolishing is to be effected. The resulting fixed emulsion then forms the masking layer defining the herringbone pattern.

The shaft 7 is formed as the anode and in the regions of the pattern, cathodes 8 are immersed in the electrolyte and the motor driven to cause the shaft to rotate. The electric potential will be selected in accordance with conventional electrochemical polishing techniques (see the aforementioned reference work) and the rotation speed of the motor should not be excessive, i.e. may be of the order of 1:10 revolutions per minute. A conventional electropolishing electrolyte is, of course, also used.

Figure 4:
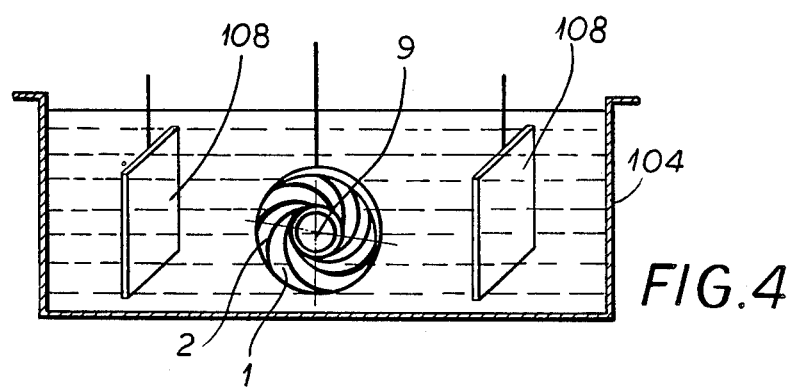
FIG. 4 is a diagram of an apparatus for producing the axial bearing pattern.

FIG. 4 shows, a corresponding device for producing a groove/land pattern for an axial bearing and here the receptacle 104 receives a pair of cathodes 108 juxtaposed with a bearing disk 9 which is formed with the groove and land pattern 1, 2. The bearing disk is positioned so that its surfaces are parallel to the cathode surfaces and, of course, the disk can be rotated to further improve the uniformity of the pattern.

We claim:

1. A method of journaling a rotatable member relative to another member, said members having juxtaposed surfaces, consisting essentially of:
   laying out a pattern of dynamic-bearing lands and grooves on a metallic one of said surfaces;
   masking lands of said pattern;
   electropolishing said one of said surfaces after the masking of said lands of said pattern to form dynamic-bearing grooves of a depth sufficient to provide a dynamic fluid bearing layer between said surfaces and up to about 100 micrometers, thereby simultaneously forming dynamic-bearing lands between said grooves;
   juxtaposing said surfaces for relative rotation; and
   admitting a dynamic bearing fluid between said surfaces whereby the grooves and lands resulting from electropolishing form a dynamic bearing between said surfaces upon relative rotation of said members, said rotatable member being a bearing in an expansion turbine.

2. The method defined in claim 1 wherein said pattern is a spiral pattern.

3. The method defined in claim 1 wherein said pattern is a herringbone pattern.

4. The method defined in claim 1 wherein said dynamic bearing grooves have a depth of substantially 1 to 30 micrometers.

* * * * *